United States Patent [19]

EmamBakhsh et al.

[11] Patent Number: 5,255,937
[45] Date of Patent: Oct. 26, 1993

[54] VEHICLE AIR BAG WITH CONTINUOUS FRAME RETAINER

[75] Inventors: Ali S. EmamBakhsh, Flat Rock; William G. McPherson, Shelby Twp., Oceana County; Mark O. Olson, Rochester Hills; Al A. Saberan, New Baltimore, all of Mich.

[73] Assignee: TRW Vehicle Safety Systems Inc., Lyndhurst, Ohio

[21] Appl. No.: 851,645

[22] Filed: Mar. 16, 1992

[51] Int. Cl.$^5$ .................................................. B60R 21/16
[52] U.S. Cl. ....................................... 280/728; 280/732
[58] Field of Search ............... 280/728, 732, 736, 740, 280/743

[56] References Cited

U.S. PATENT DOCUMENTS

| | | | |
|---|---|---|---|
| 4,698,107 | 10/1987 | Goetz et al. | |
| 4,817,828 | 4/1989 | Goetz | 280/736 |
| 4,842,300 | 6/1989 | Ziomek et al. | 280/732 |
| 4,941,678 | 7/1990 | Lauritzen et al. | 280/732 |
| 5,069,480 | 12/1991 | Good | 280/743 |
| 5,074,585 | 12/1991 | Satoh | 280/743 |

Primary Examiner—Jesús D. Sotelo
Attorney, Agent, or Firm—Calfee, Halter & Griswold

[57] ABSTRACT

An air bag subassembly has a specially designed continuous frame retainer incorporated into an air bag to enable the air bag to be coupled to the walls of an air bag container. The continuous frame retainer is configured to enable the retainer to be located inside the walls of the container. The continuous frame retainer comprises a plurality of frame components which are coupled with each other. A portion of each of the frame components has a tubular configuration with fastening structure which enables the continuous frame retainer to be fastened to the walls of the container. The frame components are formed of high carbon steel. Such material, and the tubular configuration of the portions of the frame components, provide high resistance to "fish-mouthing" of the walls of the container during deployment of the air bag.

26 Claims, 4 Drawing Sheets

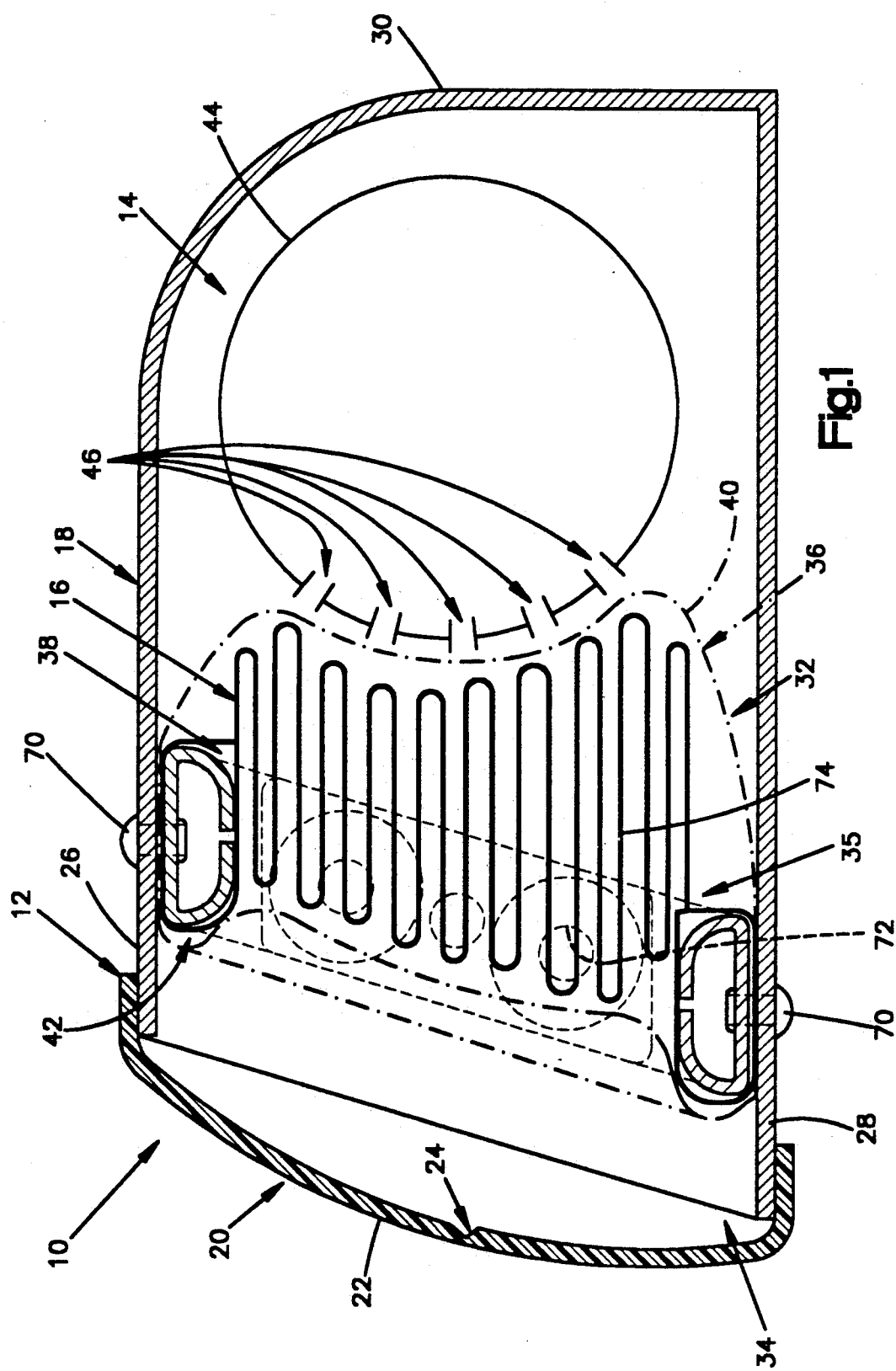

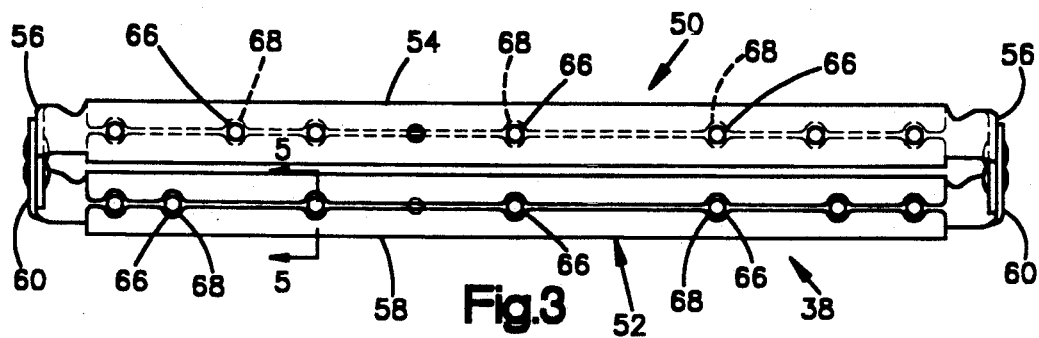
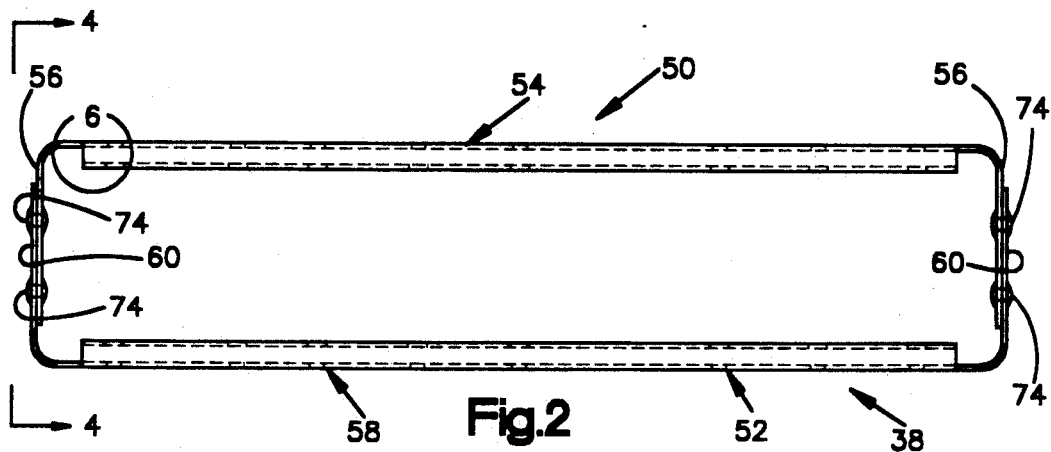
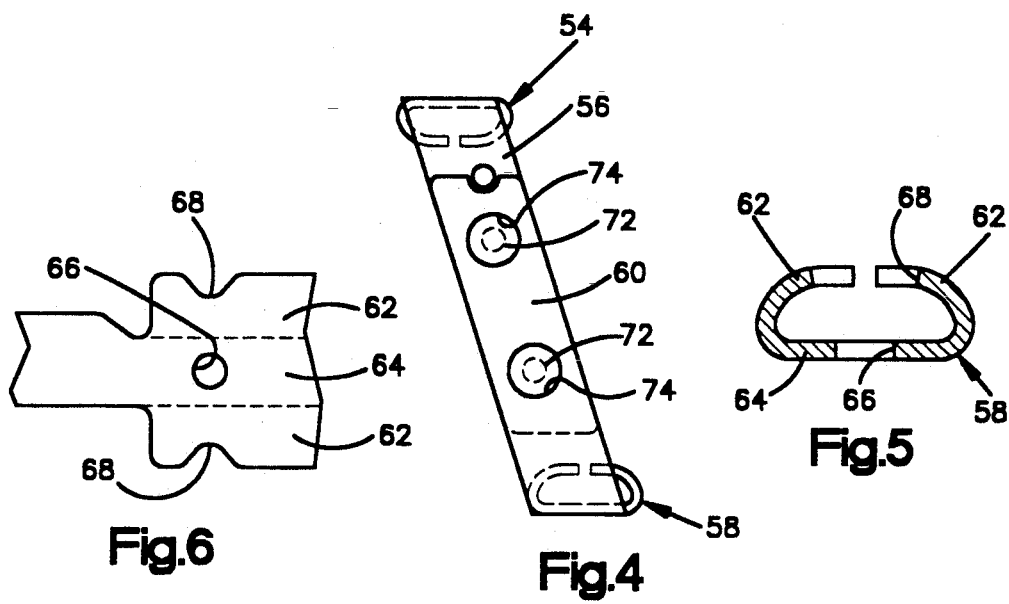

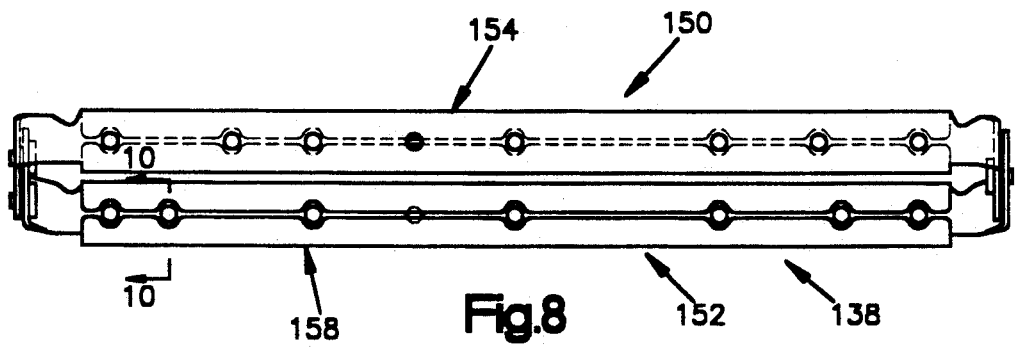
Fig.8
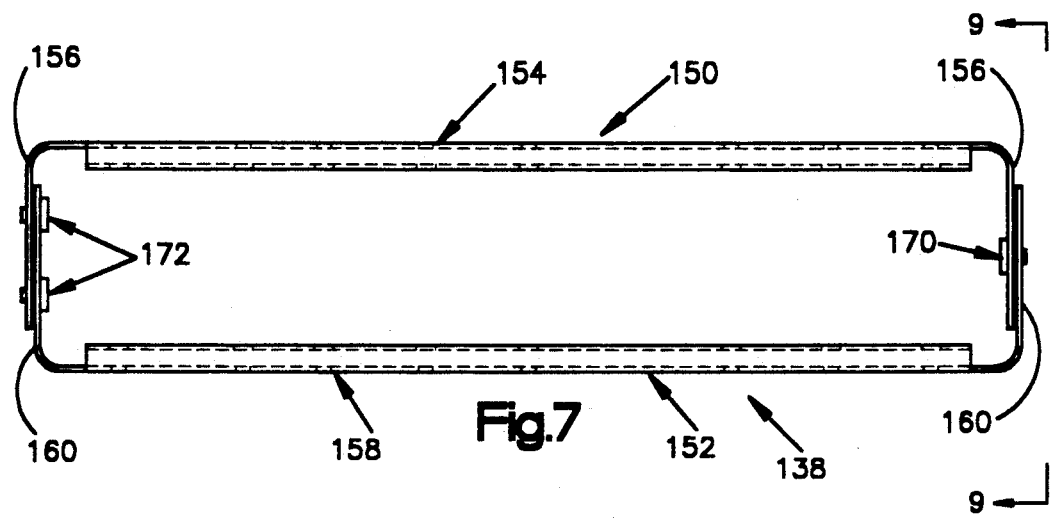
Fig.7
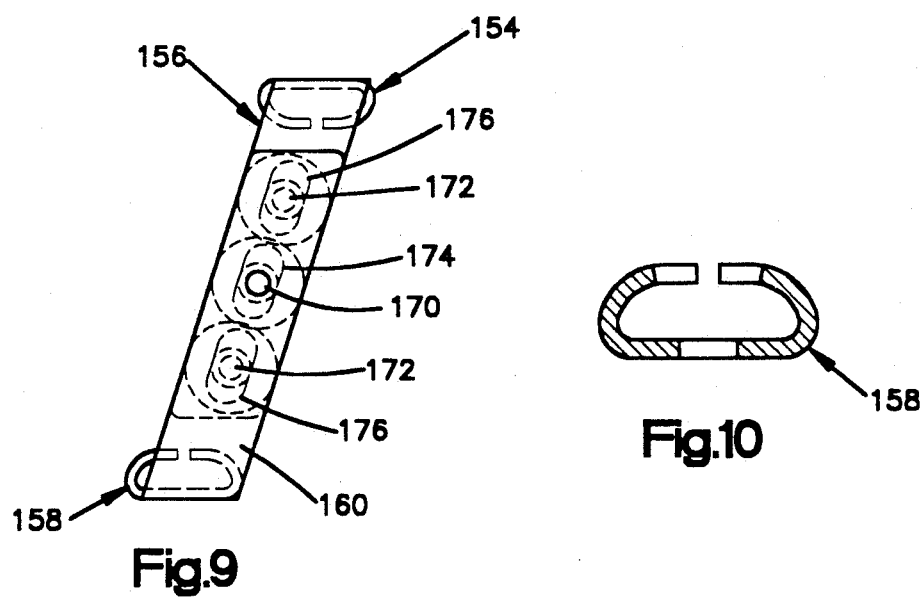
Fig.9
Fig.10

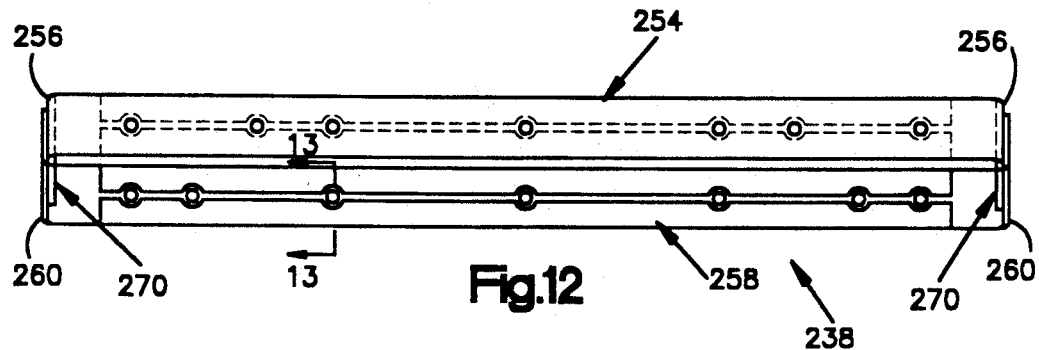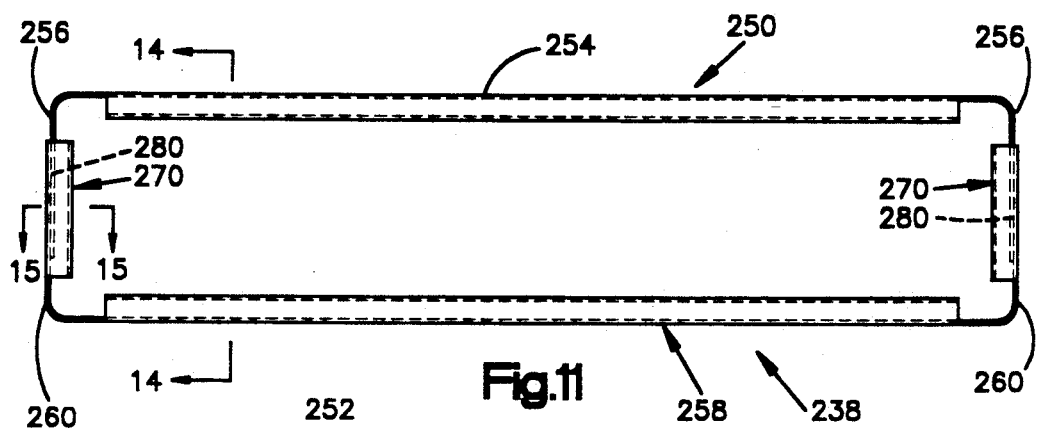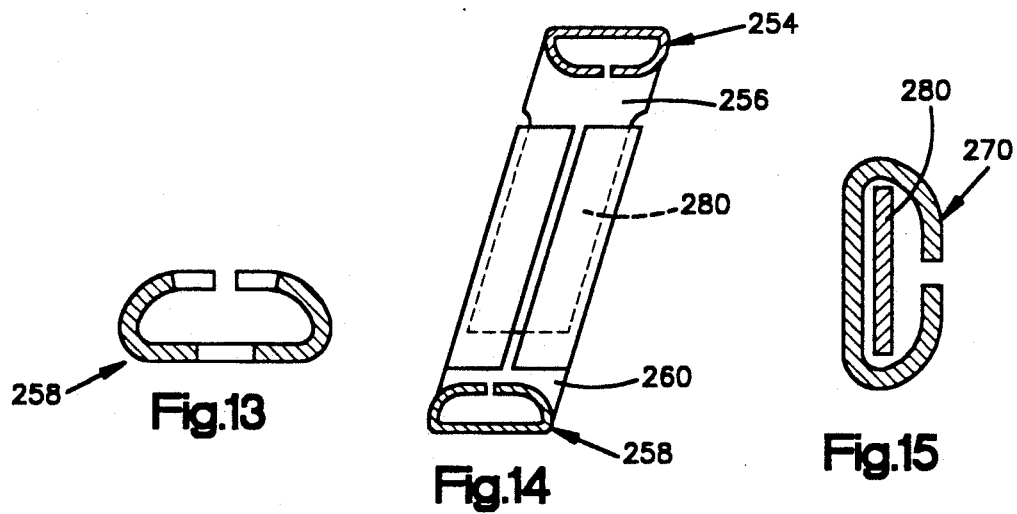

VEHICLE AIR BAG WITH CONTINUOUS FRAME RETAINER

FIELD OF THE INVENTION

The present invention relates to a vehicle air bag with a continuous frame retainer incorporated into the air bag. The continuous frame retainer is designed to enable the air bag to be attached to a container which forms part of a vehicle air bag assembly.

BACKGROUND OF THE INVENTION

A typical vehicle air bag assembly comprises a folded air bag and an inflator which are disposed in a container. When the vehicle is involved in a collision, a crash sensor closes an electrical circuit to initiate operation of the inflator. The inflator discharges an inert gas (e.g., nitrogen) which forces the air bag out of the container and inflates the air bag. The air bag assembly is located in a vehicle so that the air bag, when forced out of the container, will cushion a vehicle occupant against impact with a structural part of the vehicle. One location for an air bag assembly is in the instrument panel or dashboard on the passenger side of the vehicle.

A known container construction for a passenger side air bag assembly comprises a reaction can with walls defining an internal cavity for storing a folded air bag and an inflator. The walls also define a deployment opening through which the air bag is directed when it is being inflated. A cover, or deployment door, covers the deployment opening to complete the container. The inflator and the folded air bag are located in the internal cavity and are coupled to respective portions of the reaction can. The cover is adapted to separate when pressure is applied to it. At the onset of a vehicle collision, the air bag is directed through the deployment opening, and applies pressure to the cover. The cover separates and enables the air bag to be forced out of the container and inflated in front of a vehicle occupant who is being pitched forward by the force of the collision.

During inflation of an air bag, the reaction can, which is generally made of metal (e.g., steel sheet), must withstand significant pressures. Specifically, a passenger side inflator, when actuated, is believed to produce gas pressure of approximately 30–50 psi in the reaction can. It has been found that under such pressure, portions of the walls forming the deployment opening of the reaction can may tend to bulge outward or "fishmouth" during deployment of the air bag. When the container is located just behind the vehicle instrument panel, fishmouthing of the deployment opening of the reaction can may crack (or deform) the instrument panel. Such cracking or deformation may require replacement of the entire instrument panel.

One known technique for resisting fish-mouthing of an air bag reaction can is to bend outward certain portions of the metal walls forming the deployment opening of the reaction can. The walls are bent outward in the areas which are most prone to fish-mouthing. This technique increases the beam strength of those portions of the walls to resist fish-mouthing.

Another technique for resisting fish-mouthing of an air bag reaction can is disclosed in U.S. Pat. No. 4,842,300 to Ziomek, et al. In the Ziomek, et al. patent, a reaction member, preferably an inelastic fabric tether strap, extends across the deployment opening of the reaction can. At its ends, the tether strap is connected to the portions of the walls of the reaction can most prone to fish-mouthing. The tether strap restrains those portions of the walls of the reaction can from bulging outward under the pressures of air bag deployment.

Still other techniques for minimizing fishmouthing of the walls of an air bag receptacle are shown in co-pending application Ser. No. 07/629,427 entitled "Vehicle Air Bag Module and Method of Assembly", which is assigned to the assignee of the present invention. For example, as shown in the application, the reaction can may be specially formed with reinforcement components designed specifically to reinforce the portions of the deployment opening most prone to fishmouthing. Moreover, a continuous frame retainer is incorporated into the mouth of an air bag, for use in attaching the air bag to the reaction can. As explained in the application, the use of a continuous frame retainer provides a certain amount of inherent resistance to "fishmouthing" of the opening in the reaction can.

The preferred embodiment of the continuous frame retainer disclosed in co-pending application Ser. No. 07/629,427 has a substantially constant cross-sectional configuration. According to an alternative embodiment disclosed in the application, a selected portion of the continuous frame retainer has an additional flange. The additional flange adds beam strength to a portion of the reaction can, thereby increasing the deflection resistance of that portion of the reaction can. With a continuous frame retainer having the added beam strength, it is possible that the specially designed reinforcement components for the reaction can may be eliminated.

SUMMARY OF THE INVENTION

The present invention is an air bag subassembly, with several new and further developments of the continuous frame concept of application Ser. No. 07/629,427. Each of the new developments results in a continuous frame retainer incorporated into an air bag subassembly which is designed to be coupled to the walls of an air bag container.

According to the present invention, an air bag subassembly includes a continuous frame retainer incorporated into and forming a part of the mouth of the air bag subassembly. The continuous frame retainer is formed from a plurality of frame components which are coupled with each other. Selected portions of the frame components are designed to be fastened to the walls of an air bag container, to couple the mouth of the air bag subassembly to the walls of the air bag container. According to a preferred form of the invention, the selected portions of the frame components have tubular configurations. The tubular configurations add significant beam strength to the walls of the air bag container when the air bag subassembly is coupled to the air bag container.

In accordance with one preferred form of the invention, the frame components are designed to enable the dimension of a continuous frame retainer to be selectively adjusted. For example, in one embodiment portions of the frame components can slide relative to each other over a predetermined range. The dimension of the continuous frame retainer can thus be selectively adjusted as it is being fastened to the container. With that embodiment, the frame components are not physically fastened to each other, but are effectively coupled with each other over the predetermined range, to maintain the continuous frame retainer over the predetermined range. In another embodiment, the frame components are designed to be fastened together by fasteners (e.g., rivets). The frame members can be initially moved relative to each other over a predetermined range, and then fastened to each other at selected locations over that range. This enables the configuration of the continuous frame retainer to be selectively adjusted over the predetermined range.

In all of the foregoing embodiments, the frame components preferably comprise a pair of U-shaped frame members. Each frame member comprises a base portion and a pair of leg portions extending transverse to the base portion. Further, each base portion has a substantially tubular configuration which is designed to be fastened to the walls of an air bag container to couple the air bag subassembly to the air bag container. Also, each frame member is preferably formed of high carbon steel and subsequently heat treated, preferably to a hardness of RC 40-46. The use of heat treated, high carbon steel, coupled with the tubular profile of the base portions of the U-shaped, frame members is believed to provide particularly high beam strength. The high beam strength reinforces the walls of the container against excessive deflection when the air bag subassembly is fastened to the container. This feature is believed to be significant as air bag containers are made of lighter materials or are made in thinner sections in order to reduce weight. The additional beam strength which can be added to the walls of the container at selected locations to minimize the risk of deflection then becomes particularly important.

Further features of the present invention will become further apparent from the following detailed description and the annexed drawings.

BRIEF DESCRIPTION OF THE DRAWINGS

FIG. 1 is a schematic, cross-sectional illustration of a vehicle air bag assembly which incorporates an air bag subassembly formed according to the present invention;

FIG. 2 is a front view of a continuous frame retainer formed according to one embodiment of the present invention and designed for incorporation into an air bag subassembly according to the present invention;

FIG. 3 is a top view of the continuous frame retainer of FIG. 2;

FIG. 4 is a left side view of the continuous frame retainer of FIG. 3, taken from the direction 4—4;

FIG. 5 is a cross-sectional view of a portion of the continuous frame retainer of FIG. 3, taken from the direction 5—5;

FIG. 6 is a schematic, flat plan view of the fragmentary portion 6 of the continuous frame retainer of FIG. 2, before formation of the fragmentary portion into the cross-sectional configuration shown of FIG. 5;

FIG. 7 is a front view of a continuous frame retainer formed according to another embodiment of the present invention and designed for incorporation into an air bag subassembly according to the present invention;

FIG. 8 is a top view of the continuous frame retainer of FIG. 7;

FIG. 9 is a right side view of the continuous frame retainer of FIG. 7, taken from the direction 9—9;

FIG. 10 is a cross-sectional view of a portion of the continuous frame retainer of FIG. 8, taken from the direction 10—10;

FIG. 11 is a front view of a continuous frame retainer formed according to another embodiment of the present invention and designed for incorporation into an air bag subassembly according to the present invention;

FIG. 12 is a top view of the continuous frame retainer of FIG. 11;

FIG. 13 is a sectional view of the continuous frame retainer of FIG. 12, taken from the direction 13—13; and FIGS. 14 and 15 are sectional views of the continuous frame retainers of FIG. 11, taken from the directions 14—14 and 15—15, respectively.

DETAILED DESCRIPTION OF THE PREFERRED EMBODIMENTS

FIG. 1 illustrates a passenger side air bag assembly 10 constructed according to the present invention. The air bag assembly 10 includes a container 12 in which an inflator 14 and an air bag 16 are located. The container 12 comprises a reaction can 18 and a cover 20 coupled to the reaction can 18.

When the air bag assembly 10 is incorporated into a vehicle, the receptacle 18 is located just behind the instrument panel. The cover 20 has an outer surface 22 with a profile matching the outer profile of the vehicle instrument panel. Thus, when the air bag assembly is coupled with a vehicle, the cover 20 is effectively incorporated into and forms a part of the vehicle instrument panel.

The cover 20 has a designed weakness, such as V-shaped grooves 24 (FIG. 1), to enable the cover 20 to separate into segments during deployment of the air bag 16 from the air bag assembly 10. Preferably, the cover 20 is constructed in accordance with the teachings of U.S. Pat. No. 3,622,176. Specifically, the cover 20 comprises a flexible plastic member with the V-shaped grooves 24 formed in a predetermined configuration. The configuration of the grooves enables the cover 20 to separate into a pair of flaps when pressure is applied to the inside of the cover during deployment of the air bag 16 from the container 12.

The reaction can 18 includes a pair of spaced apart, parallel side walls (not shown), a top wall 26, a bottom wall 28, and an end wall 30 (see FIG. 1). Together these walls form an internal cavity 32 with a rectangular deployment opening 34 located opposite the end wall 30. Side flanges (not shown) can be provided to enable the cover 20 to be bolted, riveted or otherwise fastened to the reaction can 18, as is well known, in to those in the air bag art. The reaction can 18 has fastening structure (not shown) enabling the container 12 to be coupled to a portion of a vehicle, as is also well known to those in the air bag art. An example of suitable fastening structure is shown in U.S. Pat. No. 4,842,300. Various other types of suitable fastening structure are known to those of ordinary skill in the air bag art, and should require no further description.

The air bag 16 is incorporated into a prepackaged air bag unit 36 (FIG. 1). The prepackaged air bag unit 36 comprises an air bag subassembly 35 which includes (i) the air bag 16 and a continuous retainer frame 38 incorporated into the air bag, and (ii) packaging 40 surrounding the air bag subassembly 35. The air bag 16 is folded into a predetermined configuration. The air bag 16 has a fluid inlet opening defined by a mouth 42, and the continuous frame retainer 38 is incorporated into the mouth 42. The continuous frame retainer 38 enables the mouth 42 of the air bag 16 to be located immediately inside the deployment opening 34 and to be fastened to the walls of the reaction can 18 which define the deployment opening 34, as described more fully hereinafter.

The inflator 14 has a cylindrical housing 44 in which a plurality of nozzles 46 are formed (see e.g., FIG. 1). In an emergency condition, an inert gas (e.g., nitrogen) is generated within the inflator housing 44. The gas is directed rapidly through the nozzles 46 and into the air bag 16, to force the air bag 16 out of the container 12 and to inflate the air bag 16. The inert gas is generated by ignition of a solid chemical mixture (not shown) disposed within the inflator housing 44. The internal structure of the inflator can be any of a number of known constructions, including the construction illustrated in U.S. Pat. No. 4,696,705, which is a preferred construction. The inflator can also or alternatively include a container of pressurized gas that is released in an emergency situation.

The inflator 14 is inserted into the reaction can 18 by techniques which are well known to those in the air bag art. For example, the inflator 14 may be inserted through a hole in one side wall and the opposite ends of the inflator can be bolted or otherwise fixed to the side walls. Such techniques are well known to those of ordinary skill in the air bag art. As is also well known to those in the air bag art, the inflator 14 may have a locator boss (not shown) designed to be received in a recess in the end wall 30 or in a member (not shown) fixed to the end wall 30. The boss and the recess would help to ensure that the inflator 14 is properly located in the rear of the internal cavity 32 (i.e., with its nozzles 46 facing the air bag 16).

The prepackaged air bag unit 36 is located in the front portion of the internal cavity 32, and is coupled to the reaction can 18 in the manner set forth below. The order in which the inflator and prepackaged air bag unit are loaded into the reaction can is not important. Thus, the prepackaged air bag unit could be loaded into the reaction can to form a subassembly, and the inflator could be later assembled with the subassembly as the air bag assembly is being completed.

The air bag 16 is formed of a strong, synthetic fabric, such as nylon, and is folded into a predetermined configuration. The predetermined configuration is shaped to fit conveniently into the front of the internal cavity 32 and is designed for efficient deployment of the air bag from the container 12.

The continuous frame retainer 38 comprises relatively rigid, metal structure incorporated into and forming a part of the mouth 42 of the air bag 16. The air bag subassembly 35, which includes the continuous frame retainer 38 and the air bag 16 can be prefolded and then surrounded by the packaging to form the prepackaged air bag unit 36. The continuous frame retainer 38 is retained in a continuous closed tubular channel formed by the air bag material at the mouth 42 of the air bag 16. The continuous frame retainer 38 and the mouth 42 of the air bag 16 have a similar configuration to the deployment opening, and are dimensioned to fit inside the deployment opening. During installation of the prepackaged air bag unit 36 in the reaction can 18, the continuous frame retainer 38 is used to secure the mouth 42 of the air bag 16 to the walls of the reaction can 18 adjacent the deployment opening 34.

An example of one form of continuous frame retainer 38 according to the invention is shown in FIGS. 1-6. The continuous frame retainer 38 comprises two frame components 50 and 52, each of which is generally U-shaped. The frame component 50 includes a base portion 54 and a pair of leg portions 56 extending away from the base portion 54. The frame component 52 includes a similar base portion 58 and leg portions 60. Each of the base portions 54, 58 has a tubular configuration formed by bending flanges 62 (See FIG. 6) back over a central portion 64. The leg portions 56, 60 extend transverse to their respective base portions 54, 58. Further, the leg portions 56, 60 may also extend at an acute angle to their respective base portions (see FIGS. 3, 4).

Each tubular base portion 54, 58 has a plurality of rivet holes 66. As seen from FIGS. 3, 5, 6, the bent flanges 62 define holes 68 which are aligned with and slightly larger than the rivet holes 66. The difference in diameter of the holes 68 and the rivet holes 66 allows the use of blind rivets to attach the continuous frame retainer 38 to the reaction can 18. The blind rivets 70 (FIG. 1) can be driven through the rivet holes 66 and then upset in a conventional manner, to attach the continuous frame retainer 38 to the reaction can 18.

In constructing the continuous frame retainer 38 of FIGS. 2-6, the leg portions 56, 60 have aligned rivet holes 72. The rivet holes 72 allow the leg portions to be fastened to each other at predetermined locations (e.g., by rivets 74), so as to fix the frame components 50, 52 together. When fixed together, the frame components 50, 52 form a generally rectangular frame with the tubular base portions 54, 58 extending along opposite major sides of the rectangular frame.

The continuous frame retainer 38 is incorporated into the mouth 42 of an air bag 16 to complete the air bag subassembly 35. The air bag is designed so that when the continuous frame retainer is inserted into the fluid inlet opening the bag material can be turned back over the continuous frame retainer and then sewed to itself to form a fabric tube surrounding the continuous frame retainer. The air bag material can have appropriate holes punched in it. The locations of the holes are such that when the continuous frame retainer is incorporated into the air bag 16, the holes in the air bag will be aligned with the openings 66, 68 in tubular base portions 54, 58 of the continuous frame retainer 38. The tubular base portions 54, 58 are designed to be riveted to the reaction can (by means of the blind rivets 70) in order to couple the air bag subassembly to the reaction can 18.

An example of another embodiment of a continuous frame retainer which can be used in an air bag subassembly according to the invention is shown in FIGS. 7-10. A continuous frame retainer 138 is formed by a pair of U-shaped frame components 150, 152. Each of the U-shaped frame components 150, 152 comprises a tubular base portion 154, 158, respectively. Further, each of the U-shaped frame components 150, 152 has a pair of respective leg portions 156, 160, extending away from the base portion. The tubular base portions 154 and 158 are substantially similar to the base portions 54, 58 of the previous embodiment.

The leg portions 156, 160 are overlapped with each other and then fastened to each other by means of three rivets. One rivet 170 fastens two of the overlapped leg portions together, and a pair of rivets 172 fastens the other leg portions together. One of the leg portions 156 has a slot 174 and one of leg portions 160 has a pair of slots 176, 178. The slots 174, 176, 178 are designed so that the amount of overlap of the leg portions 156, 160 can be adjusted over a predetermined range before the leg portions 156, 160 are riveted together. This feature allows selective adjustment of the width of the continuous frame retainer 138 over the predetermined range.

Another example of a continuous frame retainer 238 which can be used in an air bag subassembly according to the invention is shown in FIGS. 11–15. The continuous frame retainer 238 is formed by a pair of U-shaped frame components 250, 252. Each of the U-shaped frame components 250, 252 comprises a tubular base portion 254, 258, respectively. Each of the U-shaped frame components 250, 252 also has a pair of leg portions 256, 260, extending away from the respective base portion. The tubular base portions 254 and 258 are substantially similar to the base portions 154, 158 of the previous embodiment.

The distal ends of the leg portions 260 each have tubular coupling portions 270. The distal ends 280 of the leg portions 256 are relatively flat and are dimensioned to slide inside the tubular coupling portions 270 over a predetermined range. Thus, over that predetermined range, the width of the continuous frame retainer can be selectively adjusted as the base portions of the frame components are being fastened to the reaction can.

It should be noted that in all of the foregoing frame constructions, the frame components are formed of high carbon, heat treated steel. Such a material has relatively high strength and, when coupled with the tubular configuration of the frame components, is believed to provide a particularly strong form of continuous frame retainer.

Accordingly, applicants have disclosed above several new and useful preferred techniques and structures for forming an air bag subassembly with a continuous frame retainer. With the foregoing disclosure in mind, it is believed that various other modifications of the structures disclosed above will become apparent to those of ordinary skill in this art.

What is claimed is:

1. An air bag subassembly for installation in an air bag container having wall structure, a portion of said wall structure defining a deployment opening for an air bag, said air bag subassembly comprising:

an inflatable air bag and a retainer coupled with said inflatable air bag, said air bag having a portion defining a fluid opening, said retainer being coupled with the portion of the air bag defining the fluid opening to form a mouth of the air bag;

said retainer having a shape to enable the mouth of the air bag to be located on the inside of the wall structure of the container;

said retainer comprising a plurality of frame components connected with each other to form a continuous frame, selected portions of said plurality of frame components defining fastening structure which enables the continuous frame to be fastened to the wall structure of the container; and each of said selected portions of said frame component having a tubular configuration.

2. An air bag subassembly as defined in claim 1, wherein said fastening structure comprises a plurality of holes formed in said selected portions of said frame components, each of said plurality of holes being configured to receive a respective fastener to enable said selected portions to be fastened to the wall structure of the container.

3. An air bag subassembly as defined in claim 2, wherein each of said frame components is formed of high carbon steel.

4. An air bag subassembly as defined in claim 3 wherein said frame components are heat treated.

5. An air bag subassembly as defined in claim 4, wherein said plurality of frame components comprise a pair of U-shaped frame members each of which comprises a base and a pair of legs extending transverse to the base, the base of each of said U-shaped frame members having a tubular configuration, and the legs of said U-shaped frame members being coupled with each other to complete the continuous frame.

6. An air bag subassembly as set forth in claim 5, wherein respective legs of each of the U-shaped frame members overlap each other and are coupled with each other by means of fasteners extending through the overlapped respective legs of the frame members.

7. An air bag subassembly as defined in claim 6, wherein the legs of the U-shaped frame components and the fasteners which couple the overlapped legs with each other are configured to enable the legs of the U-shaped frame components to be coupled with each other at selected locations over a predetermined range of relative overlap of the legs, to enable the configuration of the continuous frame to be selectively adjusted over the predetermined range.

8. An air bag subassembly as defined in claim 5, wherein the legs of one of the U-shaped frame members have tubular coupling portions, and the legs of the other of the U-shaped frame components are adapted to fit within and to slide within the tubular coupling portions over a predetermined range, thereby to couple the legs of the U-shaped frame members with each other and to enable the configuration of the continuous frame to be selectively adjusted over the predetermined range.

9. An air bag subassembly as defined in claim 1, wherein said plurality of frame components comprise a pair of U-shaped frame members each of which comprises a base and a pair of legs extending transverse to the base, the base of each of said U-shaped frame members having said tubular configuration, and the legs of said U-shaped frame members being coupled with each other to complete the continuous frame.

10. An air bag subassembly as set forth in claim 9, wherein respective legs of each of the U-shaped frame members overlap each other and are coupled with each other by means of fasteners extending through the overlapped respective legs of the frame members.

11. An air bag subassembly as defined in claim 10, wherein the legs of the U-shaped frame components and the fasteners which couple the overlapped legs with each other are configured to enable the legs of the U-shaped frame components to be coupled with each other at selected locations over a predetermined range of relative overlap of the legs, to enable the configuration of the continuous frame to be selectively adjusted over the predetermined range.

12. An air bag subassembly as defined in claim 9, wherein the legs of one of the U-shaped frame members have tubular coupling portions, and the legs of the other of the U-shaped frame components are adapted to fit within and to slide within the tubular coupling portions over a predetermined range, thereby to couple the legs of the U-shaped frame members with each other and to enable the configuration of the continuous frame to be selectively adjusted over the predetermined range.

13. An air bag subassembly for installation in an air bag container having wall structure, a portion of said wall structure defining a deployment opening for an air bag, said air bag subassembly comprising:

an inflatable air bag and a retainer coupled with said inflatable air bag, said air bag having a portion defining a fluid opening, said retainer being coupled with the portion of the air bag defining the fluid opening to form a mouth of the air bag;

said retainer having a shape to enable the mouth of the air bag to be located on the inside of the wall structure of the container;

said retainer comprising a plurality of frame components connected with each other by a connecting structure to form a continuous frame, selected portions of said plurality of frame components defining a fastening structure which enables the continuous frame to be fastened to the wall structure of the container; and said connecting structure being adjustable to enable a width dimension of said continuous frame to be selectively adjustable over a predetermined ranges.

14. An air bag subassembly as defined in claim 13 wherein each of said selected portions of said frame component has a tubular configuration.

15. An air bag subassembly as defined in either claim 13 or 14 wherein said fastening structure comprises a plurality of holes formed in said selected portions of said frame components, each of said plurality of holes being configured to receive a respective fastener to enable said selected portions to be fastened to the wall structure of the container.

16. An air bag subassembly as defined in either claim 13 or 14 wherein each of said frame components is formed of high carbon steel.

17. An air bag subassembly as defined in either claim 13 or 14 wherein said frame components are heat treated.

18. An air bag subassembly as defined in claim 13 wherein said plurality of frame components comprise a pair of U-shaped frame members each of which comprises a base and a pair of legs extending transverse to the base, the base of each of said U-shaped frame members having a tubular configuration, and the legs of said U-shaped frame members being coupled with each other by said connecting structure to complete the continuous frame.

19. An air bag subassembly as defined in claim 18 wherein respective legs of each of the U-shaped frame members overlap each other and wherein said connecting structure comprises fasteners extending through the overlapped respective legs of the frame members.

20. An air bag subassembly as defined in claim 19 wherein the legs of the U-shaped frame components and the fasteners which couple the overlapped legs with each other are configured to enable the legs of the U-shaped frame components to be coupled with each other at selected locations over a predetermined range of relative overlap of the legs, to enable the configuration of the continuous frame to be selectively adjusted over the predetermined range.

21. An air bag subassembly as defined in claim 20 wherein the legs of one of the U-shaped frame members have tubular coupling portions, and the legs of the other of the U-shaped frame components are adapted to fit within and to slide within the tubular coupling portions over a predetermined range, thereby forming said coupling structure to couple the legs of the U-shaped frame members with each other and to enable the configuration of the continuous frame to be selectively adjusted over the predetermined range.

22. An air bag subassembly for installation in an air bag container having wall structure, a portion of said wall structure defining a deployment opening for an air bag, said air bag subassembly comprising:

an inflatable air bag and a retainer coupled with said inflatable air bag, said air bag having a portion defining a fluid opening, said retainer being coupled with the portion of the air bag defining the fluid opening to form a mouth of the air bag;

said retainer having a shape to enable the mouth of the air bag to be located on the inside of the wall structure of the container;

said retainer comprising a plurality of frame components connected with each other to form a continuous frame, selected portions of said plurality of frame components defining fastening structure which enables the continuous frame to be fastened to the wall structure of the container;

each of said selected portions of said frame component having a tubular configuration;

wherein said mouth of said air bag comprises a continuous closed tubular channel in which said retainer is retained.

23. An air bag subassembly for installation in an air bag container having wall structure, a portion of said wall structure defining a deployment opening for an air bag, said air bag subassembly comprising:

an inflatable air bag and a retainer coupled with said inflatable air bag, said air bag having a portion defining a fluid opening, said retainer being coupled with the portion of the air bag defining the fluid opening to form a mouth of the air bag;

said retainer having a shape to enable the mouth of the air bag to be located on the inside of the wall structure of the container; and said retainer comprising a plurality of frame components connected with each other to form a continuous frame, selected portions of said plurality of frame components defining fastening structure which enables the continuous frame to be fastened to the wall structure of the container.

24. An air bag subassembly for installation in an air bag container having wall structure, a portion of said wall structure defining a deployment opening for an air bag, said air bag subassembly comprising:

an inflatable air bag and a retainer coupled with said inflatable air bag, said air bag having a portion defining a fluid opening, said retainer being coupled with the portion of the air bag defining the fluid opening to form a mouth of the air bag;

said retainer having a shape to enable the mouth of the air bag to be located on the inside of the wall structure of the container;

said retainer comprising a plurality of frame components which form a continuous frame, selected portions of said plurality of frame components defining fastening structure which enables the continuous frame to be fastened to the wall structure of the container; and each of said selected portions of said frame component having a tubular configuration.

25. An air bag subassembly for installation in an air bag container having wall structure, a portion of said wall structure defining a deployment opening for an air bag, said air bag subassembly comprising:

an inflatable air bag and a retainer coupled with said inflatable air bag, said air bag having a portion defining a fluid opening, said retainer being coupled with the portion of the air bag defining the fluid opening to form a mouth of the air bag;

said retainer having a shape to enable the mouth of the air bag to be located on the inside of the wall structure of the container;

said retainer comprising a plurality of frame components forming a continuous frame, selected portions of said plurality of frame components defining fastening structure which enables the continuous frame to be fastened to the wall structure of the container; and said connecting structure being adjustable to enable a width dimension of said continuous frame to be selectively adjustable over a predetermined ranges.

26. An air bag subassembly for installation in an air bag container having wall structure, a portion of said wall structure defining a deployment opening for an air bag, said air bag subassembly comprising:

an inflatable air bag and a retainer coupled with said inflatable air bag, said air bag having a portion defining a fluid opening, said retainer being coupled with the portion of the air bag defining the fluid opening to form a mouth of the air bag;

said retainer having a shape to enable the mouth of the air bag to be located on the inside of the wall structure of the container.

said retainer comprising a plurality of frame components forming a continuous frame, selected portions of said plurality of frame components defining fastening structure which enables the continuous frame to be fastened to the wall structure of the container;

each of said selected portions of said frame component having a tubular configuration;

wherein said mouth of said air bag comprises a continuous closed tubular channel in which said retainer is retained.

* * * * *